I. C. MAYO.
Rowlock.

No. 204,159. Patented May 28, 1878.

Witnesses
S. N. Piper
L. N. Miller

Inventor
Israel C. Mayo
by his attorney
R. H. Eddy

UNITED STATES PATENT OFFICE.

ISRAEL C. MAYO, OF GLOUCESTER, MASSACHUSETTS.

IMPROVEMENT IN ROWLOCKS.

Specification forming part of Letters Patent No. 204,159, dated May 28, 1878; application filed April 24, 1877.

*To all whom it may concern:*

Be it known that I, ISRAEL C. MAYO, of Gloucester, of the county of Essex and State of Massachusetts, have invented new and useful Improvements in Rowlocks for Boats; and do hereby declare the same to be described in the following specification, and represented in the accompanying drawings, of which—

Figure 1:
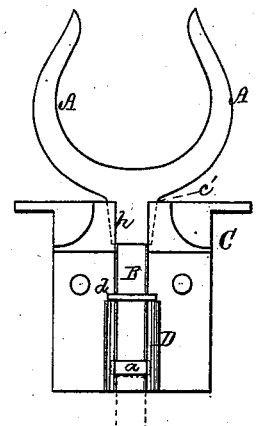
Figure 2:
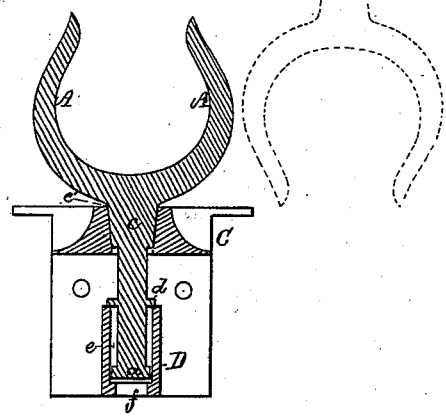
Figure 3:
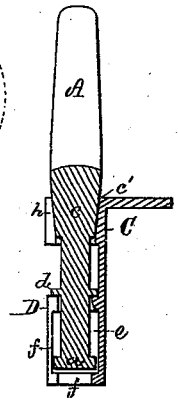

Figure 1 is a front elevation, and Figs. 2 and 3 vertical sections, taken in planes at right angles to each other, of a rowlock embodying my invention.

This rowlock has extending down from its horns A A a shank, B, provided with a head, $a$, on its lower end, and also with a journal, $c$, at its upper part, each of them having a diameter larger than that of the shank. The journal I usually make conical, and to fit into a corresponding conical bearing, $c'$, made in the bracket C. This bearing I provide with an opening, $h$, in its front, of a width a little greater than the diameter of the shank, but not sufficient to allow of the journal being moved through it (the said opening.) At a distance from the journal a little greater than the depth of the socket or bearing $c'$ there is fixed to the shank a flange or collar, $d$, below which there projects from the bracket the chambered and slotted projection D for receiving the lower part of the shank and its ball or head. Within this projection is the ball or head receiving chamber $e$, which is not only elongated vertically, as shown, but is open at top, such being not only to admit of the head being raised up within the chamber until the collar or shoulder $d$ may be brought into contact with the bottom of the bearing $c'$, but to allow of the head being drawn out of it (the said chamber) after the shank may have been turned down into a horizontal position, or thereabout. The chamber has leading out of its front and bottom a passage, $f$, of a width greater than the diameter of the shank and less than that of the ball or head thereof.

From the foregoing it will be seen that the rowlock cannot be moved laterally out of its upper bearing, or be separated from the lower one, until raised so as to bring the journal above such upper bearing; also, that the rowlock may be turned down, so as to hang in and extend below its lower bearing, or it may be readily removed from both bearings.

By having the journal and bearing conical, they maintain their close fit to each other, as they may become worn, and therefore operate to prevent rattling of the rowlock in its bracket and consequent noise while the rowlock may be in use.

I claim—

1. The bracket C, provided with a journal-bearing, $c'$, and with an elongated ball or head socket, $e$, open in front, substantially as shown and described.

2. The bracket C, provided with the journal-bearing $c'$ and the elongated ball or head socket $e$, open in front, as set forth, in combination with the rowlock A, provided with the ball or head, the shank, and the journal, all substantially as represented.

3. The rowlock having its shank provided with the journal, the ball or head, and the annular shoulder, in combination with the bracket provided with the journal-bearing and the elongated head-socket, open in front, and arranged with a clear or open space between them, (the said bearing and socket,) all being essentially as set forth.

4. The rowlock provided with the conical journal, in combination with the bracket provided with the conical bearing for such journal, and having such bearing open in front, as represented.

ISRAEL C. MAYO.

Witnesses:
R. H. EDDY,
J. R. SNOW.